(12) United States Patent
Dessart et al.

(10) Patent No.: US 12,275,098 B2
(45) Date of Patent: *Apr. 15, 2025

(54) WELDING POWER SOURCE AND CART CONNECTORS

(71) Applicant: ILLINOIS TOOL WORKS INC., Glenview, IL (US)

(72) Inventors: Nicholas James Dessart, Appleton, WI (US); Adam Richard Schmitz, Neenah, WI (US); Chris J. Roehl, Appleton, WI (US); Scott R. Rozmarynowski, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/363,149

(22) Filed: Jun. 30, 2021

(65) Prior Publication Data

US 2021/0323102 A1 Oct. 21, 2021

Related U.S. Application Data

(63) Continuation of application No. 15/941,335, filed on Mar. 30, 2018, now Pat. No. 11,084,130.

(51) Int. Cl.
*B23K 37/02* (2006.01)
*B23K 9/10* (2006.01)
*B23K 9/32* (2006.01)

(52) U.S. Cl.
CPC ............ *B23K 37/0282* (2013.01); *B23K 9/10* (2013.01); *B23K 9/327* (2013.01); *B23K 37/0294* (2013.01)

(58) Field of Classification Search
CPC .......................... B23K 9/1006; B23K 37/0282
See application file for complete search history.

(56) References Cited

U.S. PATENT DOCUMENTS

| 1,226,419 A | 5/1917 | Turner |
| 1,528,364 A | 3/1925 | Brown |

(Continued)

FOREIGN PATENT DOCUMENTS

| KR | 101392065 | 5/2014 |
| WO | 2018010796 | 1/2018 |

OTHER PUBLICATIONS

International Searching Authority, "International Search Report and Written Opinion," issued in connection with International Patent Application No. PCT/US2019/023189, mailed Jul. 16, 2019, 12 pages.

*Primary Examiner* — Jeffrey T Carley
*Assistant Examiner* — Alba T Rosario-Aponte
(74) *Attorney, Agent, or Firm* — McAndrews, Held & Malloy, Ltd.

(57) ABSTRACT

A tool less method of connecting a welding-type power source with a cart is disclosed. In some examples, the cart may be configured to carry one or more gas bottles (and/or cylinders). In some examples, the power source housing and the cart may connect at interfacing ends and/or walls of the housing and cart. A connector, such as a clip for example, may span the interface to connect the power source housing and the cart. Catches (e.g. slots, holes, crevices, and/or protrusions) may be formed in and/or on the power supply housing and/or cart proximate to the interfacing ends and/or walls. In some examples, the catches may be aligned. In some examples, the cart and/or power source housing may include alignment surfaces to assist with alignment. The connector may engage the aligned catches to connect the welding-type power source and cart together at the interface.

20 Claims, 8 Drawing Sheets

(56) References Cited

U.S. PATENT DOCUMENTS

| | | |
|---|---|---|
| 2,253,403 A | 8/1941 | Steinert |
| 5,730,891 A | 3/1998 | Karpoff et al. |
| 10,046,411 B2 | 8/2018 | Dessart et al. |
| 2005/0103823 A1 | 5/2005 | Domschot |
| 2013/0071179 A1 | 3/2013 | Mugg |
| 2014/0069906 A1* | 3/2014 | Dessart .................. B23K 9/323 |
| | | 219/136 |
| 2014/0263244 A1 | 9/2014 | Delisio |
| 2017/0349039 A1 | 12/2017 | Rayner |
| 2019/0217426 A1 | 7/2019 | Dekker |

* cited by examiner

WELDING POWER SOURCE AND CART CONNECTORS

CROSS REFERENCE TO RELATED APPLICATIONS

This application claims priority to, and the benefit of, U.S. Non-Provisional application Ser. No. 15/941,335, filed Mar. 30, 2018, entitled "WELDING POWER SOURCE AND CART CONNECTORS," the entire contents of which are hereby incorporated by reference.

TECHNICAL FIELD

The present disclosure generally relates to carts for transporting welding-type power sources and, more particularly, to connectors for securing the welding-type power sources to the carts.

BACKGROUND

Welding-type power sources are sometimes used to provide welding-type power in a work area. Sometimes the welding-type power sources need to be moved (and/or transported, repositioned, etc.) within the work area. Moving welding-type power sources by hand can be awkward, as the power sources may be bulky and/or heavy. Further, there may be environmental obstructions (e.g. wires, cords, equipment, debris, personnel, holes, etc.) that an operator may wish to avoid when moving the welding-type power sources. This may make it cumbersome and/or difficult to transport the welding-type power sources by hand. Thus, carts may be used to transport welding-type power sources.

BRIEF SUMMARY

Systems and methods are provided for connectors that secure welding-type power sources to carts, substantially as shown in and/or described in connection with at least one of the figures, as set forth more completely in the claims.

These and other advantages, aspects and novel features of the present invention, as well as details of an illustrated example thereof, will be more fully understood from the following description and drawings.

DETAILED DESCRIPTION OF THE INVENTION

Figure 1:
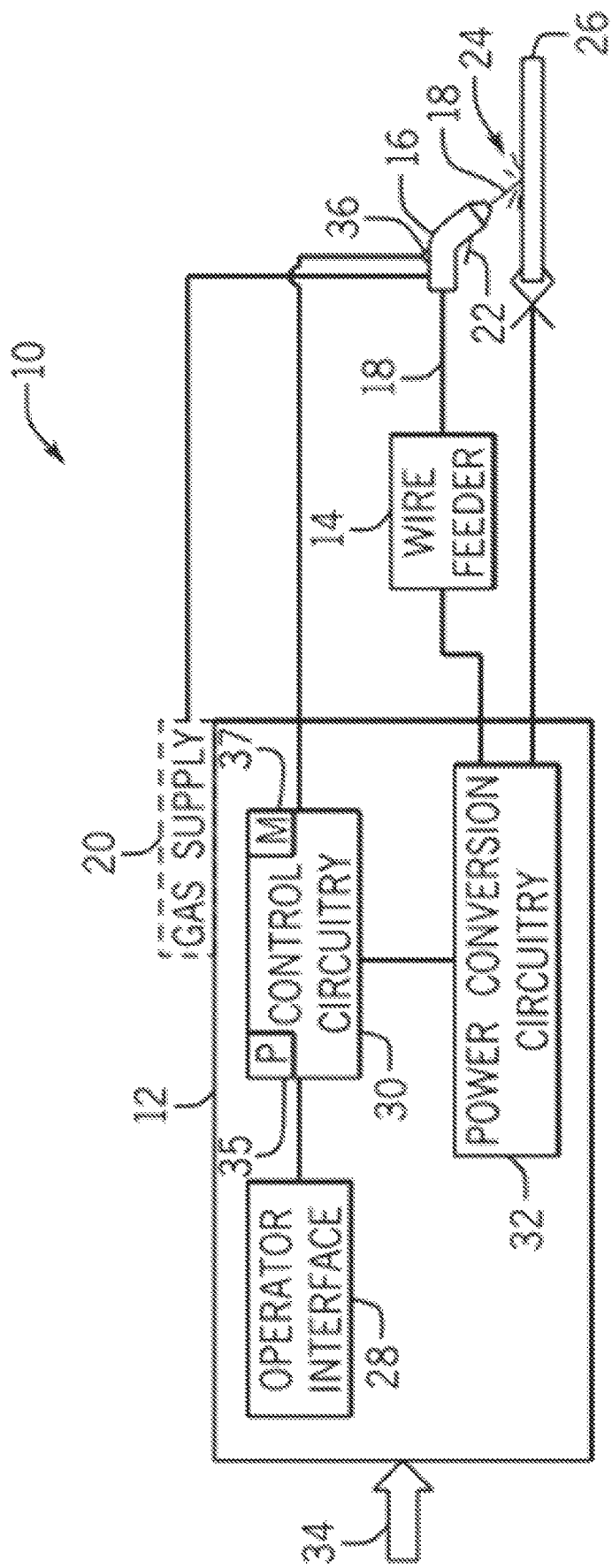
FIG. 1 is an example of a welding-type system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

The terms "coupled," "coupled to," and "coupled with" as used herein, each mean a structural and/or electrical connection, whether attached, affixed, connected, joined, fastened, linked, and/or otherwise secured. The term "attach" means to affix, couple, connect, join, fasten, link, and/or otherwise secure. The term "connect," means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type power, as used herein, refers to power suitable for welding, cladding, plasma cutting, induction heating, CAC-A and/or hot wire welding/preheating (including laser welding and laser cladding), carbon arc cutting or gouging, and/or resistive preheating.

Some examples of the present disclosure relate to a welding-type power supply, comprising a housing comprising first and second sidewalls connected by a floor, a first end wall, and a second end wall, welding-type circuitry disposed within the housing, an alignment surface formed on the housing, where the alignment surface is configured to join a complementary alignment surface of a cart, and a first clip catch positioned on the housing and configured to engage a first clip.

In some examples the alignment surface comprises a foot that protrude from the floor, and the foot is configured to fit in a hollow shoe of the cart so as to align a cart clip catch with the first clip catch. In some examples, a second clip catch is positioned on the housing and configured to engage a second clip. In some examples, the first clip is coupled to a first bezel of the first end wall. In some examples, the first clip is coupled to the first sidewall and the second clip is coupled to the second sidewall. In some examples, the first clip and the second clip are coupled to first and second spring loaded clevis pins retained by the housing, where a spring force of the first and second spring loaded clevis pins biases the first clip and the second clip against the housing. In some examples, the first and second clips are movable between a secured position and a released position, where the first clip engages the first clip catch when in the secured position, and the second clip engages the second clip catch when in the secured position. In some examples, the first clip catch comprises a first crevice defined by first crevice walls, the second clip catch comprises a second crevice defined by second crevice walls, an end of the first clip catch sits in the first crevice and engages the first crevice walls when the first clip is in the secured position, and an end of the second clip sits in the second crevice and engages the second crevice walls when the second clip is in the secured position.

Some examples of the present disclosure relate to a cart, comprising a base having an upper surface configured to receive a welding-type power supply, a lower surface opposite the upper surface, a front end, and a rear end opposite the front end, a wheel attached to the lower surface, and a first clip catch configured to engage a first clip.

In some examples, a bottle receiving platform is attached to the rear end, where the bottle receiving platform is configured to receive a gas bottle. In some examples, a second clip catch is configured to engage a second clip. In some examples, the base includes an alignment surface configured to join a complementary alignment surface of the welding power supply so as to align clip catches of the welding-type power supply with the first clip catch and the second clip catch. In some examples, the base further includes a first sidewall and a second sidewall opposite the first sidewall, where the first clip and the first clip catch are positioned on the first sidewall, and the second clip and the second clip catch are positioned on the second sidewall. In some examples, the first clip and the second clip are coupled to first and second spring loaded clevis pins retained by the base, where a spring force of the first and second spring loaded clevis pins biases the first clip and the second clip against the base. In some examples, the first and second clips are movable between a secured position and a released position, wherein the first clip engages the first clip catch when in the secured position, and the second clip engages the second clip catch when in the secured position. In some examples, the first clip catch comprises a first crevice defined by first crevice walls, the second clip catch comprises a second crevice defined by second crevice walls, an end of the first clip sits in the first crevice and engages the first crevice walls when the first clip is in the secured position, and an end of the second clip sits in the second crevice and engages the second crevice walls when the second clip is in the secured position.

Some examples of the present disclosure relate to a system comprising a welding-type power supply having a housing, a cart having a base, and a first clip movable between a securing position, where the first clip secures the power supply to the cart, and a released position, where the first clip does not secure the power supply to the cart. The housing comprises a first upper clip catch and a first alignment surface. The welding-type power supply is positioned on the base. The base comprises a first lower clip catch and a second alignment surface. The first alignment surface joins the second alignment surface so as to align the first upper clip catch with the first lower clip catch. The first clip engages the first upper clip catch and the first lower clip catch when in the securing position.

In some examples, a second clip is movable between a securing position, where the second clip secures the power supply to the cart, and a released position, where the second clip does not secure the power supply to the cart, and the housing further comprises a second upper clip catch, the base further comprises a second lower clip catch, the second upper clip catch and the second lower clip catch align when the foot of the welding power supply fits within the shoe, and the second clip engages the second upper clip catch and the second lower clip catch when in the securing position. In some examples, the first upper clip catch comprises a first upper crevice, the first lower clip catch comprises a first lower crevice, the second upper clip catch comprises a second upper crevice, and the second lower clip catch comprises a second lower crevice. In some examples, the first clip and the second clip are coupled to first and second spring loaded clevis pins retained by the base, where a spring force of the first and second spring loaded clevis pins biases the first clip and the second clip against the base, and wherein the first clip and the second clip are configured to be pulled away from the base by a force acting opposite to the spring force.

Some examples of the present disclosure relate to a tool-less method of connecting a welding-type power source with a cart. In some examples, the cart is configured to carry one or more gas bottles (and/or cylinders). In some examples, the power source housing and the cart connect at interfacing ends and/or walls of the housing and cart. A connector, such as a clip for example, may span the interface to connect the power source housing and the cart. Catches (e.g. slots, holes, crevices, and/or protrusions) may be formed in and/or on the power supply housing and/or cart proximate to the interfacing ends and/or walls. In some examples, the catches are aligned. In some examples, the cart and/or power source housing include alignment surfaces to assist with alignment. The connector may engage the aligned catches to connect the welding-type power source and cart together at (and/or across) the interface.

In some examples, the connector is configured to rotate (and/or move, pivot, turn, transition, etc.) between a secured position where the connector engages the catches and an unsecured position where the connector does not engage the catches. While in the secured position, the connector's engagement with the catches secures the power source to the cart, so as to substantially prevent the power source from falling and/or moving off the cart while in motion. The connectors may also allow an operator to lift up on the power source housing (e.g. lift up on a handle and/or a front end wall of the power source housing) and lift the cart as well as the power source through the connector connection. This may allow an operator to more easily lift the power source and/or cart up over obstructions in a work area (e.g. wires, cords, debris, bumps, holes, etc.).

In some examples, the connectors comprise C and/or U shaped clips. In some examples, the clips are J shaped and/or L shaped. In some examples, the clips are retained by spring loaded clevis pins. A spring force of the spring loaded clevis pins biases the pins against the cart and/or power source housing. In some examples, the spring force retains ends of the clips within the catches when the clips are in the secured positions. In such a position, the power source is secured to the cart by the clips, which engage catches on both the cart and the power source housing. In some examples, the clips resist movement of the power source relative to the cart (and/or vice versa) when in the secured position. An operator may provide a force opposite and/or equal to (or larger than) the spring force to move the clips to an intermediate position away from the power source and/or cart. In some examples, the clips are removed from the catches when in the intermediate position. Once the clips have been removed from the catches, the clips may be rotated (and/or turned) to move them from a secured position to an unsecured position. In the unsecured position, the clips do not secure the power source to the cart or resist movement of the power source relative to the cart.

FIG. 1 shows an example of a welding-type system 10 that may use any of the example connectors and/or other components discussed above and/or below. While the specific welding-type system 10 of FIG. 1 is a gas metal arc welding (GMAW) system, other types of welding-type systems may be used. FIG. 1 illustrates the welding-type system 10 as including a welding-type power source 12 coupled to a wire feeder 14. In the illustrated example, the power source 12 is separate from the wire feeder 14, such that the wire feeder 14 may be positioned at some distance from the power source 12 near a welding location. However, it should be understood that the wire feeder 14, in some examples, may be integral with the power source 12. In some examples, the wire feeder 14 may be removed from the system 10 entirely. In some examples, the power source 12 supplies welding-type power to a torch 16 through the wire feeder 14. In some examples, the power source 12 may supply welding-type power directly to the torch 16. In the example of FIG. 1, the wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. In some examples, no gas supply 20 may be used. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

Figure 2:
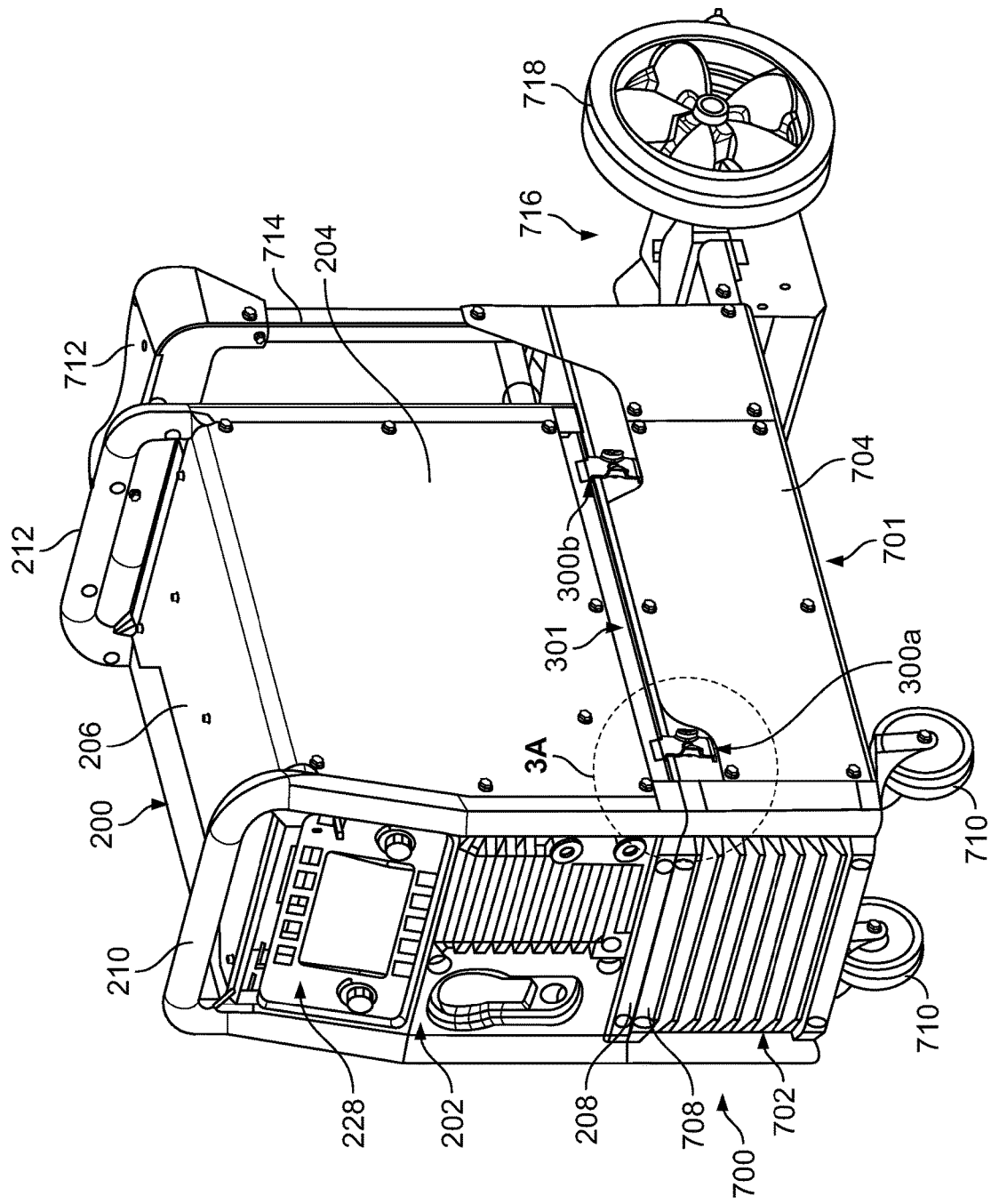
FIG. 2 is a perspective view of an example welding-type power supply connected to a cart, in accordance with aspects of this disclosure.

In some examples, the welding system 10 may receive data settings from the operator via an operator interface 28 provided on the power source 12 (and/or power source housing). In the example of FIG. 2, the operator interface 28 is incorporated into a faceplate 228 of the power source 12 (and/or power source housing), and may allow for selection of settings such as the welding-type process (e.g., stick, TIG, MIG), the type of electrode 18 to be used, voltage and current settings, transfer mode (e.g., short circuit, pulse, spray, pulse), and so forth. For example, the welding system 10 may allow for MIG welding (e.g., pulsed MIG welding) with electrodes 18 (e.g., welding wires) of various materials, such as steel or aluminum, to be channeled through the torch 16. The weld settings may be communicated to control circuitry 30 within the power source 12.

In some examples, the control circuitry 30 operates to control generation of welding-type power for carrying out the desired welding-type operation. In the example of FIG. 1, the control circuitry 30 is coupled to the power conversion circuitry 32, which may supply the welding-type power (e.g., pulsed waveform) that is applied to the torch 16. In the example of FIG. 1, the power conversion circuitry 32 is coupled to a source of electrical power as indicated by arrow 34. The source may be a power grid, an engine-driven generator, batteries, fuel cells or other alternative sources. In some examples, the control circuitry 30 may control the current and/or the voltage of the welding-type power supplied to the torch 16. The control circuitry 30 may monitor the current and/or voltage of the arc 24 based at least in part on one or more sensors 36 within the wire feeder 14 and/or torch 16. In some examples, a processor 35 of the control circuitry 30 may determine and/or control the arc length or electrode extension based at least in part on feedback from the sensors 36. The processor 35 may determine and/or control the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30.

FIG. 2 shows an example housing 200 for the welding-type power source 12. The housing 200 is connected to a cart 700. In the example of FIG. 2, the housing 200 includes a front wall 202 having a faceplate 228 for the operator interface 28, a rear wall opposite the front wall, a left sidewall 204, a right sidewall opposite the left sidewall, a top wall 206, and a bottom wall. The housing 200 further includes a front bezel 208 on the front wall 202. Though not shown, the rear wall may have a similar rear bezel. In the example of FIG. 2, the housing 200 includes a front handle 210 connected to the housing 200 (e.g. the front wall 202) and a rear handle 212 connected to the housing 200 (e.g. the rear wall). The front handle 210 connects to the housing proximate the front wall 202 and extends above and/or away from the top wall 206. The rear handle 212 connects to the housing proximate the rear wall and extend above and/or away from the top wall 206.

In the example of FIG. 2, the cart 700 includes a base 701. The base 701 comprises a front wall 702, a rear wall opposite the front wall, a left sidewall 704, a right sidewall opposite the left sidewall 704, a top wall 706, and a bottom wall opposite the top wall 706. In the example of FIG. 2, the cart 700 also includes a front bezel 708 on the front wall 702. The base 701 further includes a pair of front wheels 710 underneath (and/or spaced from) the bottom wall of the cart 700. The front wheels 710 are connected to the base 701 by means known to those of skill in the art. The cart 700 further includes handlebars 712 raised above the top wall 706 of the base 701. In the example of FIG. 2, the handlebars 712 are connected to the base 701 via stanchions 714. The cart 700 further includes a bottle receiving platform 716 connected to the base 701 proximate the rear wall. The bottle receiving platform 716 may be configured to receive bottles, such as gas bottles containing gas for use by gas supply 20, for example. In the example of FIG. 2, the bottle receiving platform 716 is coupled to rear wheels 718.

In the example of FIG. 2, the base 701 and housing 200 meet at a connection interface 301. More particularly, the top wall 706 of the base 701 meets the bottom wall of the housing 200 at the connection interface 301. One or more clip connectors 300 connect the housing 200 to the cart 700 at the interface 301. The clip connectors 300 span the interface 301 to connect the power source housing 200 to the cart 700. In the example of FIG. 2, four clip connectors 300 are used to connect the power source housing 200 to the cart 700. Two clip connectors 300 are used on each side (left and right) of the housing 200 and cart 700. Each clip connector 300 is positioned proximate corners of the left sidewalls 204, 704 of the housing 200 and cart 700. Though not shown, the clip connectors 300 may be similarly arranged at corners of the right sidewalls. One clip connector 300a is shown positioned proximate intersections (and/or corners) of the left sidewall 204, front wall 202, and bottom wall of the power source housing 200, and/or intersections (and/or corners) of the left sidewall 704, front wall 702, and top wall 706 of the cart 700. Another clip connector 300b is shown positioned proximate intersections (and/or corners) of the left sidewall 204, rear wall, and bottom wall of the power source housing, and/or intersections (and/or corners) of the left sidewall 704, rear wall, and top wall 706 of the cart 700. In some examples, this arrangement may be mirrored on the other side of the power source housing 200 and/or cart 700.

Figure 3A:
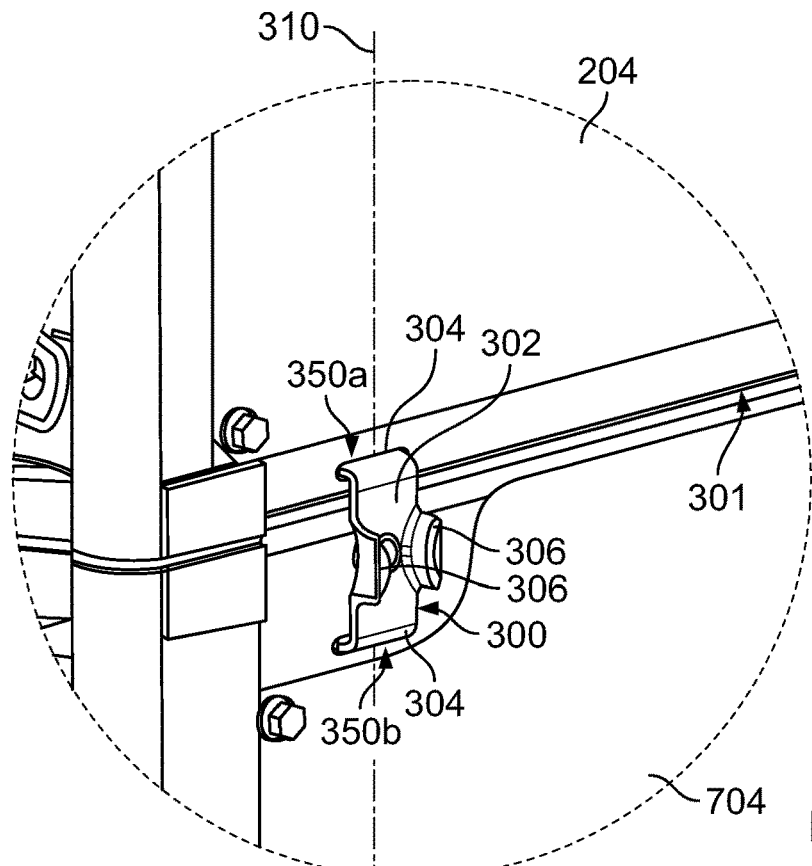
FIGS. 3a-3c are magnified views of a connection interface between the welding-type power supply and cart of FIG. 1, in accordance with aspects of this disclosure.
Figure 3B:
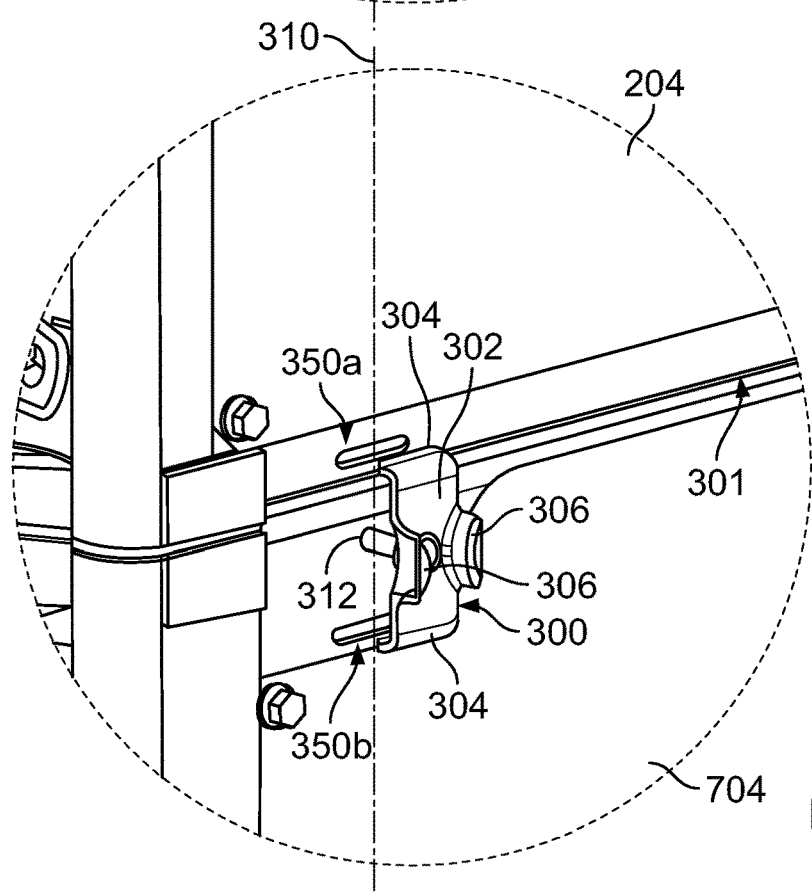
Figure 3C:
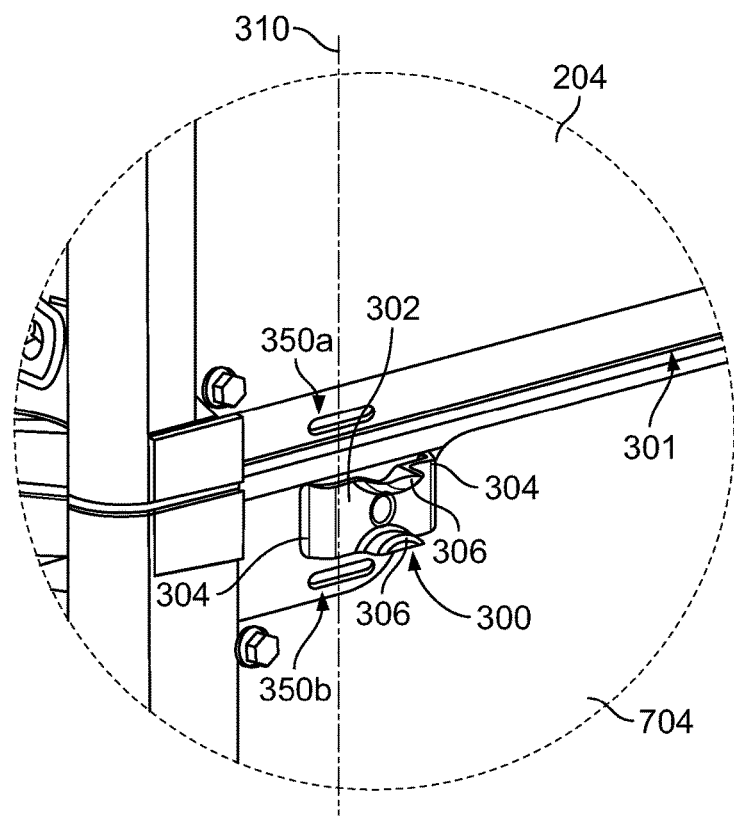

FIG. 3a shows a magnified portion of FIG. 2, centering on the clip connector 300. The clip connector 300 is shown in the secured position. While the clip connector 300 is shown attached to the base 701 of the cart 700 in the example of FIG. 3a, in some examples the clip connector 300 may instead be attached to the housing 200 and/or to bezels, brackets, panels, and/or other attachments to the housing 200 and/or cart 700. FIGS. 3a-3c illustrates the movement of the clip connector from a secured position, where the clip connector 300 securely couples the power source housing 200 to the cart, to an intermediate position, where the clip connector 300 is free to move between the secured and unsecured positions, to an unsecured position, where the clip connector 300 does not couple the power source housing 200 to the cart 700.

In some examples, the clip connector 300 may be formed of a plastic material. In some examples, the clip connector 300 may be formed of a nylon and/or glass material. In the example of FIG. 3a, the clip connector 300 comprises a body 302 having opposite ends 304 comprising clip catch engagement portions. The body 302 is substantially flat and planar. The body 302 includes grips 306 to help an operator grasp the clip connector 300. The ends 304 of the clip connector 300 curve away from the body 302 to form an approximately 90 degree angle with the body 302. Thus, the shape of the clip connector 300 resembles a "C" or "U". When in the secured position, the ends 304 engage clip catches 350. In the example of FIGS. 3a-3c, the clip catches 350 are crevices (and/or slots, holes, etc.) formed in and/or defined by the sidewalls of the cart 700 and housing 200. Clip catch 350a is formed in the left sidewall 204 of the housing 200, while clip catch 350b is formed in the left sidewall 704 of the cart 700.

In some examples, the clip catches 350 may be formed in and/or on one or more bezels, brackets, panels, and/or other attachments to the housing 200 and/or cart 700, rather than the housing 200 and/or cart 700 themselves. In the example of FIGS. 3a-3c, the clip catches 350 are substantially aligned along an axis 310 that is perpendicular to a rotational axis 311 of the clip connector 300. While in the secured position, the clip catch engagement portions (e.g. ends 304) of the clip connector 300 engage the clip catches 350. In the example of FIG. 3a, the ends 304 of the clip connector 300 engage the clip catches 350 by extending into (and/or fitting in, sitting in, etc.) the crevices and/or abutting the walls defining the crevices. While in the secured position, the clip connector 300 resists movement of the housing 200 away from the cart 700.

FIG. 3b shows the clip connector 300 in an intermediate position. When in the intermediate position, the clip connector 300 is moved away from the housing 200 and/or cart 700. In some examples, an operator may move the clip connector 300 to the intermediate position 700 by grasping the grips 306 (and/or other portions) of the clip connector 300 and pulling the clip connector 300 in a direction parallel to a rotational axis 311 of the clip connector 300. In the example of FIG. 3b, the clip connector 300 is held to the base 701 by a constant spring force of a spring loaded pin 312, such as a spring loaded clevis pin, for example. An operator may move the clip connector 300 away from the cart 700 and/or base 701 by pulling with a force larger than, and opposite to, the spring force. When the clip connector 300 is moved sufficiently far from the housing 200 and/or cart 700, the clip catch engagement portions (e.g. ends 304) of the clip connector 300 may disengage from the catches 350. In the example of FIG. 3b, this means that the ends 304 of the clip connector 300 may be removed from the crevices. Once removed and/or disengaged from the catches 350, the clip connector 300 is in the intermediate position and is free to move between the secured and unsecured positions.

FIG. 3c shows the clip connector 300 in an unsecured position. The clip connector 300 is once again held against the base 701 by the constant spring force of the clevis pin 350. The ends 304 are removed and/or disengaged from the catches 350. When the clip connector 300 is in the unsecured position it no longer resists movement of the power source housing 200 relative to the cart 700. When all the clip connectors 300 are in the unsecured position, the housing 200 may be removed from the cart 700 with no resistance by the clip connectors 300.

In some examples, a single connector 300 may be used, such as on a single sidewall or end wall of the welding-type power source housing 200 or cart 700. In instances where only one connector 300 is used on a sidewall and/or end wall, the connector 300 may be centered on the sidewall or end wall. In some examples, two or more connectors 300 may be used. In some examples, two connectors 300 may be used, with one connector 300 on each sidewall or each end wall of the power source housing 200 or cart 700. In some examples four connectors 300 may be used, with two connectors 300 on each sidewall or end wall of the power source housing 200 or cart 700. In examples where each sidewall and/or end wall has two connectors 300, each connector may be placed proximate a corner of the sidewalls and/or end walls of the power source housing 200 or cart 700. In some examples, six connectors 300 may be used, with one connector 300 on each end wall of the power source housing 200 or cart 700, and two connectors on each sidewall of the power source housing 200 or cart 700. In some examples, six connectors 300 may be used with one connector 300 on each sidewall and two connectors 300 on each end wall of the power source housing 200 or cart 700. In some examples, more than six connectors 300 may be used. In some examples, each connector 300 may be configured to engage two catches 350—one catch 350 on the power source housing 200 and one catch 350 on the cart 700. At least a portion of the catches 350 may be substantially aligned for engagement of and/or by the connector 300.

In some examples, the connectors 300 may be positioned on and/or attached to the cart 700. In some examples, the connectors 300 may be positioned on and/or attached to the power source housing 200. In some examples one or more connectors 300 may be positioned on and/or attached to the cart 700, while one or more other connectors 300 are positioned on and/or attached to the power source housing 200.

Figure 4:
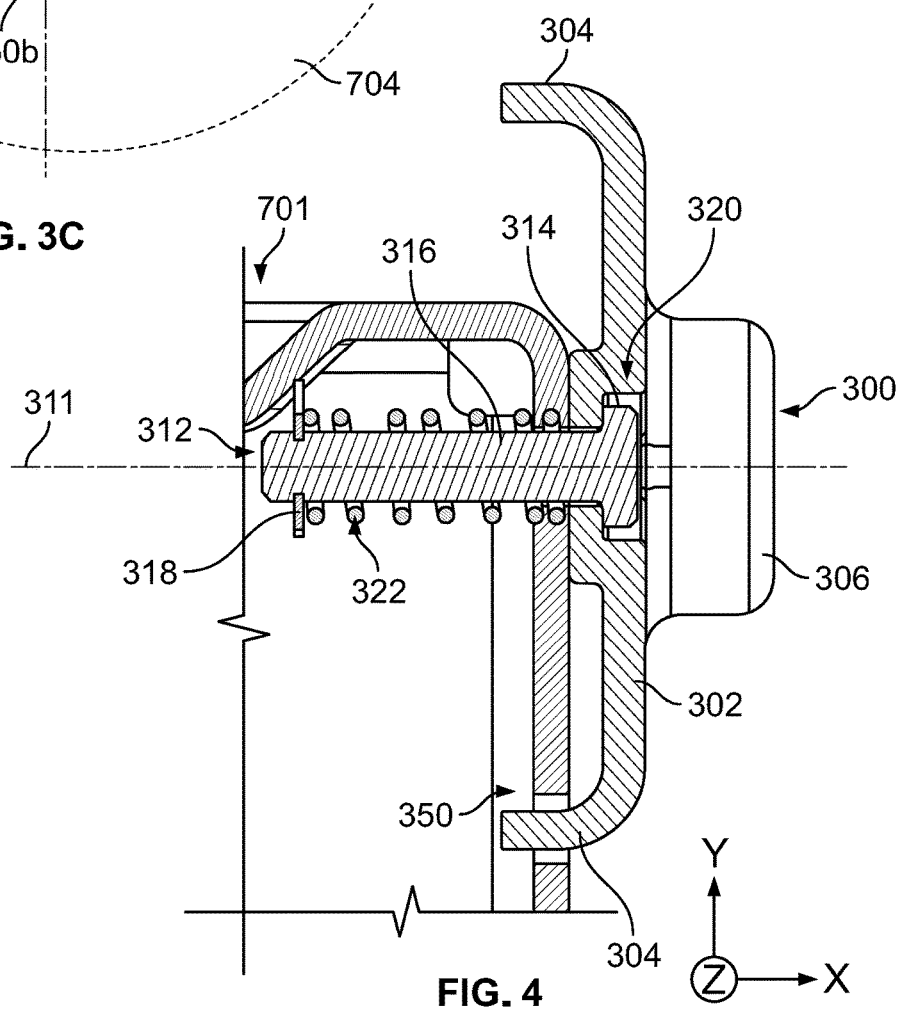
FIG. 4 is a diagram illustrating an example connector, in accordance with aspects of this disclosure.

FIG. 4 shows a diagram illustrating the attachment of the clip connector 300 to the base 701 of the cart 700. While FIG. 4 shows the clip connector 300 attached to the cart 700, in some examples the clip connector 300 may be attached to the housing 200 using a similar arrangement. In the example of FIG. 4, the clip connector 300 is held against the cart 700 by a constant spring force of a spring loaded clevis pin 312. The constant spring force is in a direction parallel to the rotational axis 311 of the clevis pin 312 and/or clip connector 300. More particularly, the spring force is in the −X direction of the XYZ coordinate system shown in FIG. 4.

In the example of FIG. 4, the spring loaded clevis pin 312 is positioned within a channel of the base 701. The clevis pin 312 includes a head 314 at one end of a shank 316, and a collar 318 near an opposite end of the shank 316. The clip connector 300 includes an opening 320 within which the head 314 of the clevis pin 312 fits. The shank 316 of the clevis pin 312 is loaded into a center bore of a spring 322, such that the spring 322 surrounds a portion of the shank 316 between the collar 318 and the head 314. The spring 322 is in contact with the collar 318 and an internal surface of the base 701 of the cart 700. In the example of FIG. 4, the spring 322 is partially compressed between the collar 318 and the base 701. The partial compression provides a spring force substantially (and/or approximately) parallel to a rotational axis 311 of the clip connector 300 and/or clevis pin 312 (e.g. in the −X direction). The spring force holds the clip connector 300 against the base 701 of the cart 700 absent a counteracting force opposite to the spring force (e.g. in the +X direction). If and when the clip connector 300 is moved (and/or pulled) away from the base 701 to the intermediate position, the spring force may resist the movement. Additionally, the spring 322 may further compress, thereby increasing the spring force. Once the counteracting force is removed (e.g. the operator lets go of the clip connector 300), the spring force may move the clip connector 300 back to its resting position held against the base 701 of the cart 700.

In some examples, the constant spring force may be larger when the clip connector 300 is in the unsecured position than in the secured position. When in the secured position, a portion of the body 302 surrounding the opening 320 may the base 701, while the clip catch engagement portions (e.g. ends 304) are engaged to the clip catches 350 (e.g. in the crevices). However, when in the unsecured position, the clip catch engagement portions (e.g. ends 304) may be disengaged and/or removed from the clip catches 350 (e.g. crevices). Thus, rather than the body 302 abutting the base 701, the clip catch engagement portions (e.g. ends) may abut the base 701, thereby spacing the head 314 of the pin 312 farther from the base 701, and further compressing the spring 322, which may increase the spring force.

In some examples, other fasteners and/or fastening mechanisms may be used in place of the spring loaded clevis pin 312. For example, a spring loaded nut and bolt, cotton pin, or shoulder bolt may be used. In some examples, a shaft may be molded and/or extruded from the clip connector 300 itself and spring loaded to produce the same functionality of the spring loaded clevis pin 312. In some examples, an elastic band may be used. In some examples, a compressible foam may be used. In some examples, a push to open and/or push to close latch may be used in place of the spring loaded clevis pin 312. In some examples, the clip connector 300 may be attached to the base 701 using a nut and screw fastener, such that the clip connector 300 is held tightly against the base 701 when the nut is tightened to the screw fastener, and the clip connector 300 is held loosely against the base (such that the connector 300 may be moved between secured, intermediate, and/or unsecured positions) when the nut is loosened.

Figure 5A:
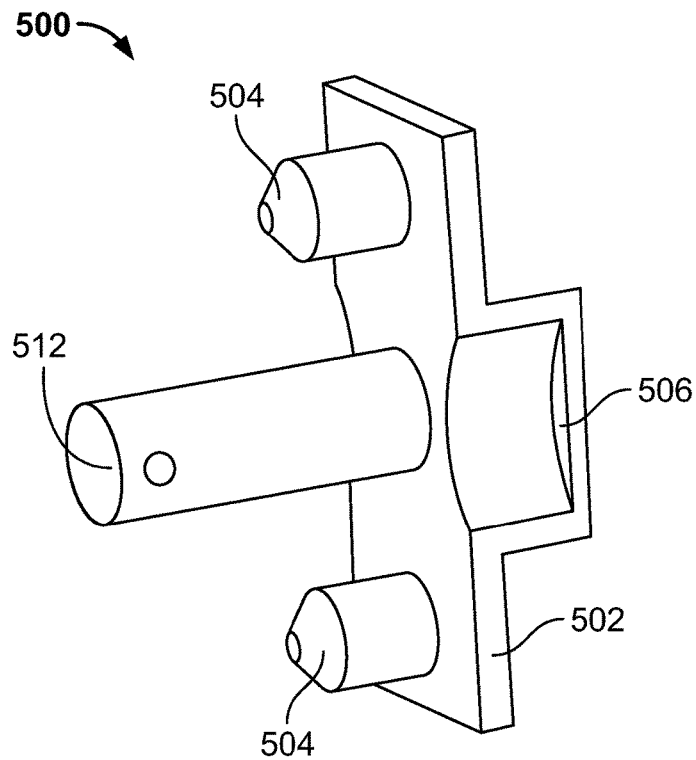
FIG. 5a is a perspective view of another example connector, in accordance with aspects of this disclosure.

In some examples, the clip connector 300 may have different clip catch engagement portions. For example, the clip connector 300 may have other surfaces that engage the clip catches 350 rather than ends 304. FIG. 5a shows an example of a clip connector 500 having protrusions 504 that serve as clip catch engagement portions. The protrusions 504 are formed on the underside of the body 502, but not quite at the ends of the clip connector 500 (though in some examples, the protrusions 504 may be formed at the ends of the clip connector 500). The protrusions 504 are approximately cylindrical, with frustoconical points. In examples where the clip connectors 500 are used, the clip catches 350 may be appropriately shaped to accommodate the protrusions 504. For example, the clip catches 350 may comprise crevices having a more rounded (and/or cylindrical) form. In some examples, the protrusions 504 may instead be more semispherical or polyhedral, with appropriately formed clip catches 350 to accommodate. In the example of FIG. 5a, the clip connector 500 also has a body 502 and grips 506 similar to the body 302 and grips 306 of the clip connector 300. The clip connector 500 further has a shaft 512 that is molded and/or extruded from the material of the clip connector 500. The shaft 512 may be inserted into a channel of the cart 300 (and/or housing 200) and/or spring loaded to achieve a rotational configuration and/or constant spring force similar to the clevis pin 312 of the clip connector 300. In some examples, one or more clip connectors 500 may be used in place of one or more clip connectors 300.

Figure 5B:
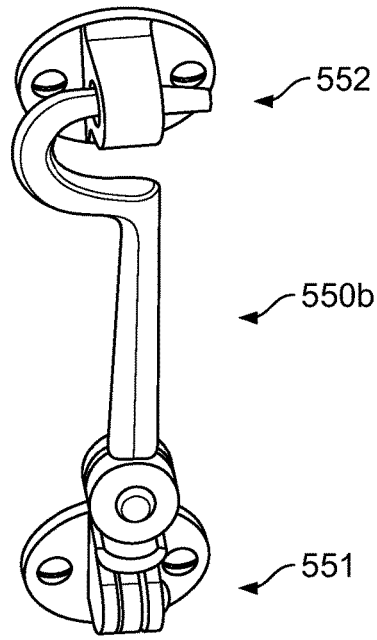
FIGS. 5b-5e are views of other example connectors, in accordance with aspects of the is disclosure.
Figure 5C:
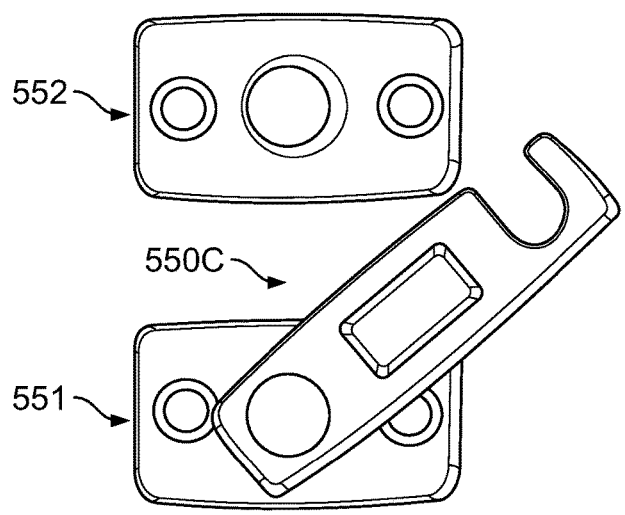
Figure 5D:
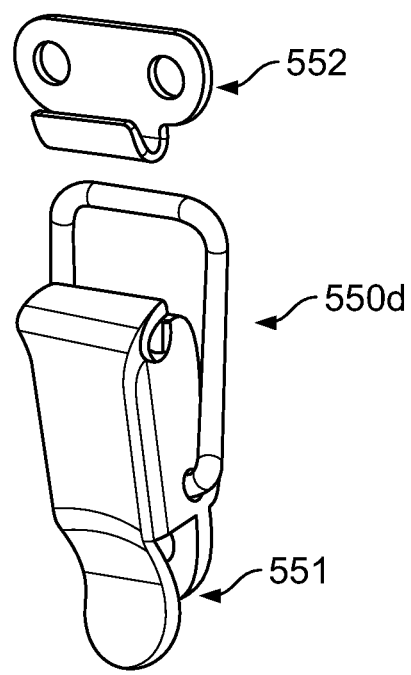
Figure 5E:
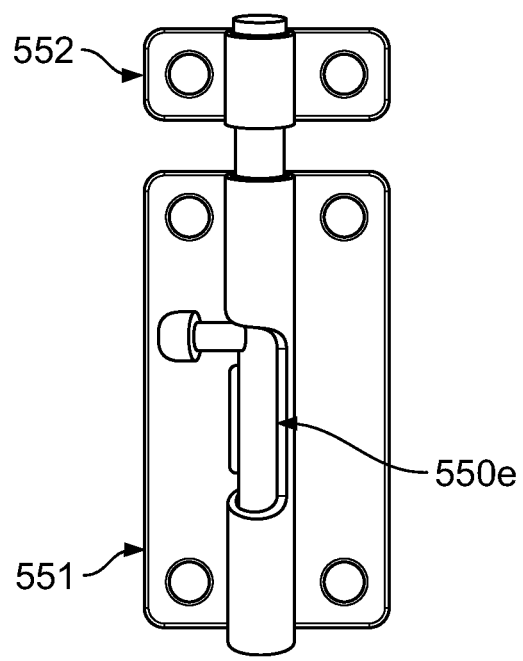

FIGS. 5b-5c shows other examples of clip connectors 550. The clip connectors 550 of FIGS. 5b-5e have no clevis pin 312. Rather, they may be connected to the cart 700 or housing 200 through a clip catch 551. The clip catch 551 comprises the attachment point for the clip connector 550. Thus, the clip connectors 550 are continually engaged to one clip catch 551, both in the secured and/or unsecured positions. The other clip catch 552 continues to operate as a connecting catch, for the clip connector 550 to engage when in the secured position.

Clip connectors 550b and 550c comprise hooks that move about pivots on the clip catch 551 to engage clip catches 552. Clip connector 550c has a latch that engages the clip catch 552 when in the secured position. Clip connector 550e comprises a sliding bolt that engages the clip catch 552 when in the secured position.

In some examples, the housing 200 and/or cart 700 may include alignment surfaces to align the clip catches 350 of the housing 200 with the clip catches 350 of the base 701. The alignment surfaces may include complementary formations on the top wall 706 of the base 701 of the cart 700 and the bottom wall of the power source housing 200. In some examples, the complementary surfaces may engage and/or interact to position the housing 200 atop the cart 700 such that their respective catches 350 are appropriately positioned to allow the connector 300 to engage both catches 350 simultaneously.

Figure 6:
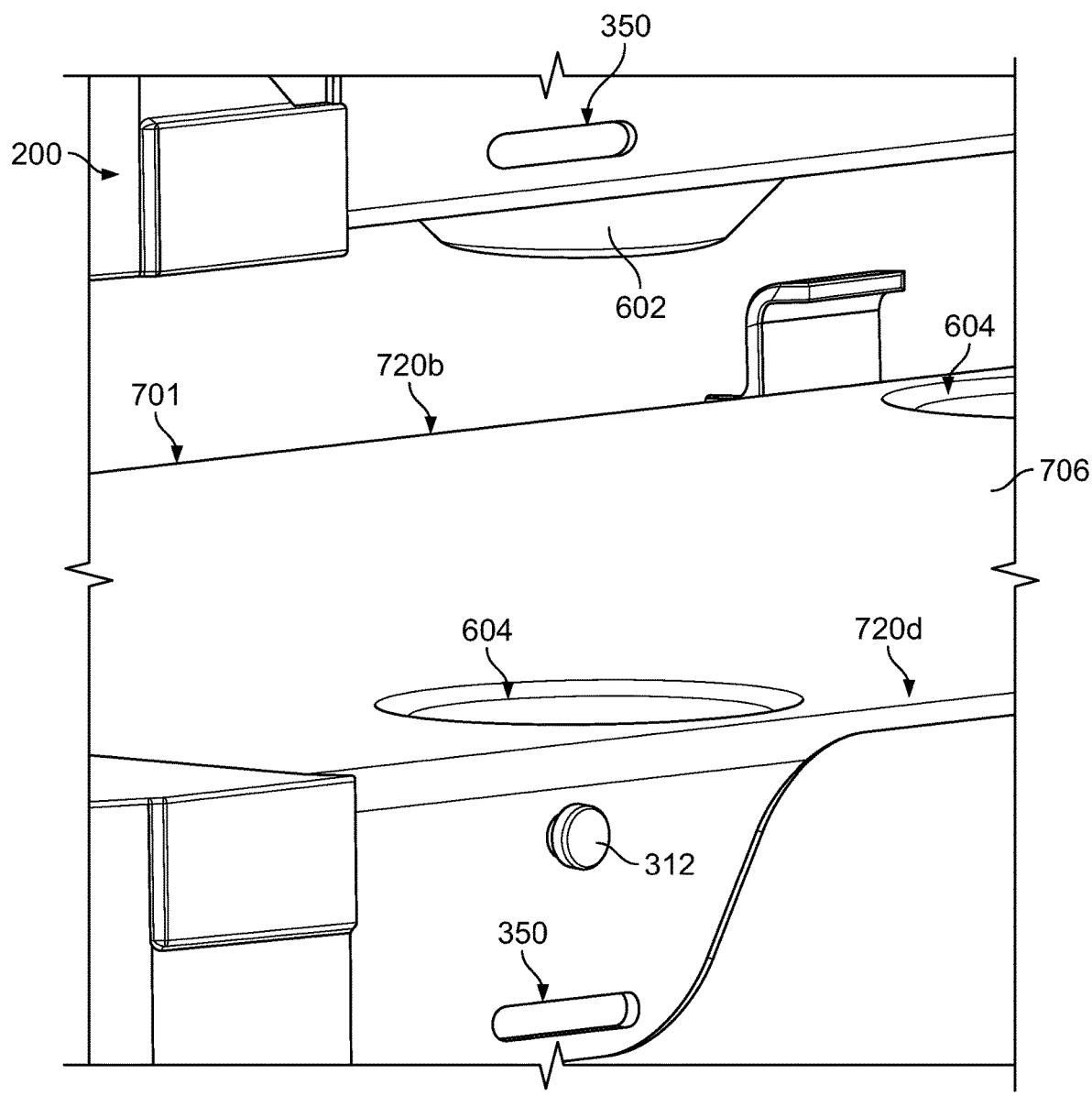
FIG. 6 is a perspective view of example alignment surfaces of an example welding-type power supply housing and an example cart, in accordance with aspects of this disclosure.

In the example shown in FIG. 6, the alignment surfaces include a protruding foot 602 and a complementary hollow shoe 604. The protruding foot 602 is formed on and/or protruding from the bottom wall of the housing 200. The hollow shoe 604 is formed in/on the top wall 706 of the cart 700. The hollow shoe 604 is defined by one or more walls of the base 701 (e.g. the top wall 706 of the base 701). The hollow shoe 604 is sized and/or shaped to fit the protruding foot 602. The protruding foot 602 is similarly be sized and/or shaped to fit within the hollow shoe 604.

Figure 7:
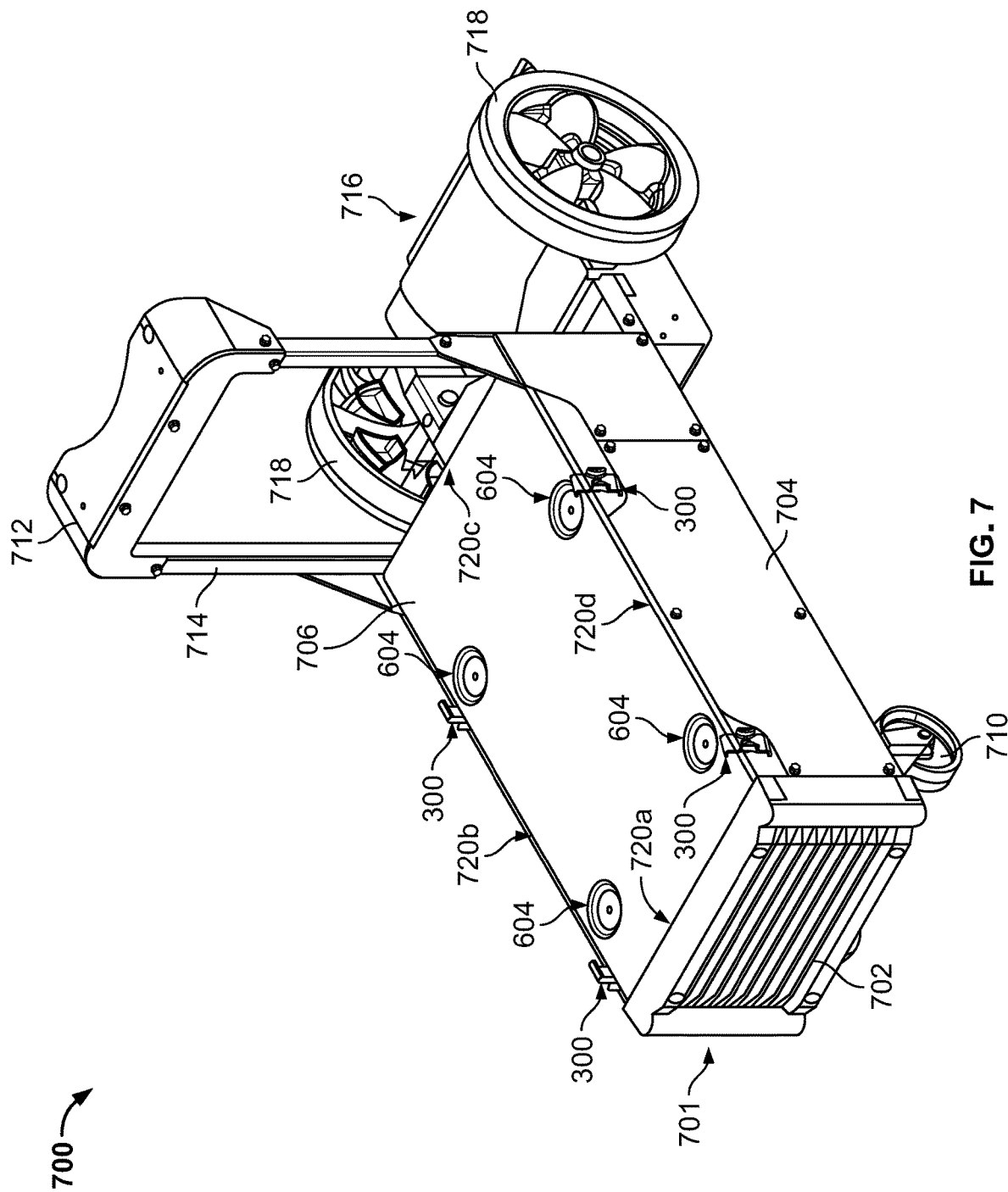
FIG. 7 is a perspective view of an example cart, in accordance with aspects of this disclosure The figures are not necessarily to scale. Similar or identical reference numerals may be used to refer to similar or identical components.

In the example shown in FIG. 6, the base 701 includes two hollow shoes 604. In some examples, the hollow shoes 604 may be positioned proximate opposite corners of the base 701 (e.g. right rear corner, left front corner), such as shown, for example, in FIG. 6. More particularly, the hollow shoes 604 may be positioned proximate intersections of a front edge 720a and right edge 720b of the top wall 706 (front right corner), proximate intersections of a rear edge 720c and right edge 720b of the top wall 706 (rear right corner), proximate intersections of a rear edge 720c and left edge 720d of the top wall 706) (rear left corner), and/or proximate intersections of a front edge 720a and left edge 2720d of the top wall 706 (front left corner). In some examples, the hollow shoes 604 may be positioned midway along the length of opposite edges 720 of the top wall 706 (e.g. left edge 720d and right edge 720b, and/or front edge 720a and rear edge 720c). In the example of FIG. 7, the base 701 includes four hollow shoes 604. In some examples, the hollow shoes 604 may be positioned proximate the four corners of the base 701, such as shown, for example, in FIG. 7. In some examples, the hollow shoes 604 may be positioned approximately midway along the length of each edge 720. In some examples, one or more additional hollow shoes 604 may be positioned proximate a middle or center of the top wall 706. The housing 200 may include protruding feet 602 in a same or similar arrangement to fit in the hollow shoes 604. In some examples, the housing 200 may include the same number of protruding feet 602 as the cart 700 has hollow shoes 604. In some examples, the housing 200 may include less protruding feet 602 than hollow shoes 604. In some examples, the cart 700 may instead have the protruding feet 602, and the housing 200 may include the hollow shoes 604.

In some examples, the housing 200 and/or cart 700 may include different alignment surfaces. For example, the cart 700 may include an angled base 701 with stops positioned around the base 701 to help align the housing 200. In such an example, gravity causes the housing 200 to slide down the base 701 until the housing 200 encounters the stops, which serve to align the housing 200 with the cart 700. In some examples, the cart 700 may include one or more posts that may be received by one or more complementary anchors. The anchors may be comprised of slots, holes, openings, apertures, and/or other appropriate structures. The posts may be formed on and/or attached to the base 701 (e.g. the sidewalls and/or top wall 706). The anchors may be formed on and/or attached to the housing 200 (e.g. the sidewalls and/or bottom wall of the housing 200). In some examples, the housing 200 may include the posts and the cart 700 may include the anchors. The posts join with the anchors when the housing 200 is positioned on the cart 70, so as to align the housing 200 and the cart 700.

In operation, an operator may wish to transport a welding-type power source 12 enclosed by the housing 200 on a cart 700. The operator may move the connector(s) 300 to an unsecured position before placing the housing 200 on the cart 700. When placing the housing 200 on the cart 700, the operator may make sure to align the alignment surfaces of the housing 200 with the alignment surfaces of the cart 700. Once the housing 200 is on the cart 700 and properly aligned, the operator may secure the housing 200 to the cart 700 by moving the connector(s) 300 from the unsecured position to the secured position. In so doing, the operator may move the connector(s) 300 to the intermediate position first, so that movement from the unsecured position to the secured position is possible (and/or easier). Once the clip connector(s) 300 are in the secured position, with each connector 300 engaging its respective aligned catches 350 on the housing 200 and cart 700, the power source 12 may be moved by moving the cart 700 to which it is secured. If there are obstacles on the ground that an operator wishes to avoid, the operator may steer the cart 700 around the obstacles. Alternatively, or additionally, the operator may wish to lift up the housing 200 and/or cart 700 to clear an obstruction. In such a situation, the operator may lift up on the housing 200 (e.g. via the handle 210 and/or 212) and the connector(s) 300 will transfer the lifting force of the operator on the housing 200 to the cart 700, such that the cart 700 is lifted up as well. After transportation is complete, an operator need only move the connector(s) 300 to the unsecured position before removing the power source 12 from the cart 700. No additional tools need be used to perform the securing and/or unsecuring operations.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a housing;
   welding-type circuitry disposed within the housing;
   a first clip catch positioned on the housing;
   a first clip coupled to the housing, the first clip being movable between a secured position and a released position, the first clip engaging the first clip catch on the housing and a first complementary clip catch of a cart when in the secured position; and
   an alignment surface formed on the housing, the alignment surface comprising a protrusion that protrudes from the housing, the alignment surface configured to mate with a complementary alignment surface of a cart to align the first clip catch with the first complementary clip catch of the cart.

2. The welding-type power supply of claim 1, wherein the first clip catch comprises a first crevice defined by first crevice walls, an end of the first clip catch sitting in the first crevice and engaging the first crevice walls when the first clip is in the secured position, and the end of the first clip catch not sitting in the first crevice and not engaging the first crevice walls when the first clip is in the released position.

3. The welding-type power supply of claim 1, wherein the housing comprises a first sidewall and a second sidewall connected by a first end wall, a second end wall, and a floor at a bottom end of the housing, the alignment surface protruding from the floor.

4. The welding-type power supply of claim 3, wherein the first clip is coupled to a first bezel of the first end wall, and the first clip catch is positioned on the first bezel of the first end wall.

5. The welding-type power supply of claim 1, further including a second clip catch positioned on the housing, the second clip catch configured to engage a second clip, the second clip catch being aligned with a second complementary clip catch of the cart when the alignment surface mates with the complementary alignment surface of the cart.

6. The welding-type power supply of claim 5, further comprising the second clip.

7. The welding-type power supply of claim 6, wherein the housing comprises a first sidewall and a second sidewall, the first clip is coupled to the first sidewall, and the second clip is coupled to the second sidewall.

8. The welding-type power supply of claim 6, wherein the first clip and the second clip are coupled to first and second spring loaded pins retained by the housing, wherein a spring force of the first and second spring loaded pins bias the first clip and the second clip against the housing.

9. The welding-type power supply of claim 8, wherein the secured position and the released position comprise a first secured position and a first released position, the second clip is movable between a second secured position and a second released position, the first clip catch comprises a first crevice defined by first crevice walls, the second clip catch comprises a second crevice defined by second crevice walls, a first clip end of the first clip sits in the first crevice and engages the first crevice walls when the first clip is in the first secured position, and a second clip end of the second clip sits in the second crevice and engages the second crevice walls when the second clip is in the second secured position.

10. The welding-type power supply of claim 1, wherein the welding-type circuitry comprises power conversion circuitry configured to receive input power from a power source and convert the input power to welding-type output power.

11. A welding-type power supply, comprising:
a welding power supply housing;
welding-type circuitry disposed within the welding power supply housing;
a first clip catch positioned on the welding power supply housing; and
a first clip coupled to the welding power supply housing, the first clip being movable between a secured position and a released position, the first clip engaging the first clip catch on the welding power supply housing and a first complementary clip catch not on the welding power supply housing when in the secured position.

12. The welding-type power supply of claim 11, wherein the first clip catch comprises a first crevice defined by first crevice walls, an end of the first clip catch sitting in the first crevice and engaging the first crevice walls when the first clip is in the secured position, and the end of the first clip catch not sitting in the first crevice and not engaging the first crevice walls when the first clip is in the released position.

13. The welding-type power supply of claim 11, wherein the welding power supply housing comprises a first sidewall and a second sidewall connected by a first end wall, a second end wall, and a floor at a bottom end of the welding power supply housing.

14. The welding-type power supply of claim 13, wherein the first clip is coupled to a first bezel of the first end wall, and the first clip catch is positioned on the first bezel of the first end wall.

15. The welding-type power supply of claim 11, further including a second clip catch positioned on the welding power supply housing, the second clip catch configured to engage a second clip, the second clip catch being aligned with a second complementary clip catch of the cart when the alignment surface mates with the complementary alignment surface of the cart.

16. The welding-type power supply of claim 13, wherein the floor is rectangular or comprises a rectangular prism.

17. The welding-type power supply of claim 15, further comprising the second clip, wherein the housing comprises a first sidewall and a second sidewall, the first clip is coupled to the first sidewall, and the second clip is coupled to the second sidewall.

18. The welding-type power supply of claim 17, wherein the first clip and the second clip are coupled to first and second spring loaded pins retained by the welding power supply housing, wherein a spring force of the first and second spring loaded pins bias the first clip and the second clip against the welding power supply housing.

19. The welding-type power supply of claim 18, wherein the secured position and the released position comprise a first secured position and a first released position, the second clip is movable between a second secured position and a second released position, the first clip catch comprises a first crevice defined by first crevice walls, the second clip catch comprises a second crevice defined by second crevice walls, a first clip end of the first clip sits in the first crevice and engages the first crevice walls when the first clip is in the first secured position, and second clip end of the second clip sits in the second crevice and engages the second crevice walls when the second clip is in the second secured position.

20. The welding-type power supply of claim 11, wherein the welding-type circuitry comprises power conversion circuitry configured to receive input power from a power source and convert the input power to welding-type output power.

\* \* \* \* \*